(12) United States Patent
Hallaj et al.

(10) Patent No.: US 6,468,689 B1
(45) Date of Patent: Oct. 22, 2002

(54) THERMAL MANAGEMENT OF BATTERY SYSTEMS

(75) Inventors: Said Al Hallaj; Jan Robert Selman, both of Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 0 days.

(21) Appl. No.: 09/515,268

(22) Filed: Feb. 29, 2000

(51) Int. Cl.[7] ............................................. H01M 10/50
(52) U.S. Cl. ......................................... 429/120; 429/62
(58) Field of Search ................................. 429/120, 176, 429/62

(56) References Cited

U.S. PATENT DOCUMENTS

| | | | |
|---|---|---|---|
| 3,780,356 A | | 12/1973 | Laing |
| 4,057,104 A | | 11/1977 | Altoz |
| 4,389,533 A | | 6/1983 | Ames |
| 4,413,157 A | | 11/1983 | Ames |
| 4,883,726 A | * | 11/1989 | Peled .......................... 424/120 |
| 5,158,841 A | * | 10/1992 | Mennicke ................... 429/120 |
| 5,224,356 A | | 7/1993 | Colvin et al. |
| 5,272,491 A | | 12/1993 | Asakawa et al. |
| 5,285,559 A | | 2/1994 | Thompson et al. |
| 5,449,571 A | * | 9/1995 | Longardner .................. 429/120 |
| 5,505,788 A | | 4/1996 | Dinwoodie |
| 5,552,961 A | | 9/1996 | Van Gaal et al. |
| 5,557,208 A | * | 9/1996 | Parker ......................... 324/435 |
| 6,059,016 A | * | 5/2000 | Rafalovich .................... 165/41 |

FOREIGN PATENT DOCUMENTS

| | | | | |
|---|---|---|---|---|
| DE | 42 30 583 | | 3/1994 | |
| GB | 2289976 | * | 6/1995 | .......... H01M/10/50 |
| JP | 58 166679 | | 10/1983 | |
| JP | 358166679 | * | 10/1983 | .......... H01M/10/50 |
| JP | 61 218072 | | 9/1986 | |
| JP | 09 270263 | | 10/1997 | |

* cited by examiner

*Primary Examiner*—Patrick Ryan
*Assistant Examiner*—Mark Ruthkosky
(74) *Attorney, Agent, or Firm*—Pauley Petersen Kinne & Erickson

(57) ABSTRACT

The invention is to a method of operating a power supply system comprising the steps of discharging at least one cell element of a battery module to produce a quantity of power and a quantity of heat; absorbing at least a portion of the heat in a phase change material in thermal contact with the discharging cell element; following discharge, releasing at least a portion of the heat from the phase change material to heat the at least one cell element; and discharging the at least one cell element at elevated temperature.

11 Claims, 7 Drawing Sheets

THERMAL MANAGEMENT OF BATTERY SYSTEMS

BACKGROUND OF THE INVENTION

This invention relates generally to battery power supply and, more particularly, to thermal management in such battery power supply systems. The word "battery" here is meant to include various forms of electrochemical power generation which have in common that chemical energy, in the form of one or more chemical reactants stored in a confined space, react with each other or with an external reactant in an electrochemical reaction, so as to produce electric power when desired.

Various uses of battery power supplies have been well established. For example, the packaging together of a plurality of cells in a parallel or series configuration to form a battery module or pack for use as a power supply for personal electronic devices such as cell phones, lap top computers, camcorders or the like have become well-known and common. In addition, desirable properties or characteristics of battery power supplies including, for example, the capability of certain battery power supplies to be recharged makes such battery power supplies potential power sources for vehicle propulsion, i.e., electric vehicles (EV). Recently, the concept as well as the application of battery power has been extended to include "fuel batteries" or "fuel cell batteries", in which a fuel cell reaction is used to generate electric power similarly as in a conventional rechargeable battery, but in which one of the reactants (the fuel) must be replenished from time to time.

In various such applications, it is common that a number of cells be packed together in a preselected configuration (e.g., in parallel or in series) to form a battery module. A number of such battery modules may, in turn, be combined or joined to form various battery packs such as are known in the art. During operation and discharge, such cells, battery modules or battery packs commonly produce or generate quantities of heat which can significantly impact the performance resulting therefrom. Thus, in order to maintain desired or optimal performance by such cells or resulting battery modules or battery packs, it is generally important to maintain temperature of such cells, battery module or battery packs within fairly narrow prescribed ranges.

In practice, temperature variations between individual cells can result from one or more of a variety of different factors including, for example:
1) changes in ambient temperature;
2) unequal impedance distribution among cells and
3) differences in heat transfer efficiencies among cells.

Differences in heat transfer efficiencies among cells can typically primarily be attributed to the cell pack configuration. For example, cell elements at the center of a cell pack configuration may tend to accumulate heat while those cell elements at the periphery of a cell pack configuration will generally tend to be more easily or freely cooled as a result of heat transfer to the surrounding environment. Further, such variation in heat transfer efficiencies may lead to further differences in impedance such as may serve to amplify capacity differences among the cells. Such capacity imbalances can cause or result in some cells being overcharged or over-discharged which in turn may result in premature failure of the cell pack or specific cell elements thereof. In particular, such failures may take the form of thermal runaway or accelerating capacity fading.

Thermal management systems based on the use of active cooling (e.g., such as based on forced circulation of air, liquid or other selected cooling medium) have been proposed for use in conjunction with such battery power supply systems. However, the incorporation and use of such active cooling regimes may introduce a level of complexity in either or both power supply design and operation such as may hinder or prevent the more widespread use of such power supplies.

Further, the required or desired size of a battery power supply is generally dependent on the specific application thereof. Thus, certain contemplated or envisioned applications for such power supplies, such as to power electric vehicles, for example, may necessitate the use of such power supplies which have or are of significantly larger physical dimensions that those commonly used or available. As will be appreciated by those skilled in the art, thermal management in power supply systems can become even more critical or significant as the size of such cell, battery module, or battery pack is increased.

Thus, there is a need and a demand for new and improved power supply systems and methods of operation which permit either or both more efficient and effective thermal management. In particular, there is a need and a demand for such power supply systems and methods of operation which desirably avoid the potential complications and complexities of typically contemplated active cooling thermal management systems. Further, there is a need and a demand for a well designed thermal management system such as can desirably better ensure one or more of the performance, safety or capacity of an associated power supply.

SUMMARY OF THE INVENTION

A general object of the invention is to provide an improved power supply system and method of operation.

A more specific objective of the invention is to overcome one or more of the problems described above.

The general object of the invention can be attained, at least in part, through a power supply system which includes at least one cell element capable of a heat-generating charge or discharge of electric power and a supply of phase change material in thermal contact with the at least one cell element whereby the phase change material absorbs at least a portion of the heat generated upon a discharge of power from the at least one cell element.

The prior art generally fails to provide a power supply system and method of operation which provides or results in thermal management which is either or both as effective and efficient as may be desired. Further, the prior art generally fails to provide power supply system thermal management and operation such as may more conveniently or effectively permit the use of larger-sized battery power supplies such as contemplated or envisioned for certain applications, such as to power electric vehicles, for example.

The invention further comprehends a method of operating a power supply system. In accordance with one embodiment of the invention, such a method includes discharging at least one cell element to produce a quantity of power and a quantity of heat. Alternatively, the charging of at least one cell element may produce similarly a quantity of heat. At least a portion of the quantity of heat is absorbed in a phase change material in thermal contact with the discharging cell element. Such method further includes subsequently releasing at least a portion of the absorbed quantity of heat from the phase change material to heat the at least one cell element.

Other objects and advantages will be apparent to those skilled in the art from the following detailed description taken in conjunction with the appended claims and drawings.

DETAILED DESCRIPTION OF THE INVENTION

The present invention generally provides an improved power supply system and method of operation. More particularly, the invention provides an improved power supply system and method of operation such that provide or result in improved thermal management such as wherein undesired temperature excursions and non-uniformity of temperature can be appropriately reduced, minimized or otherwise suitably managed.

Figure 1:
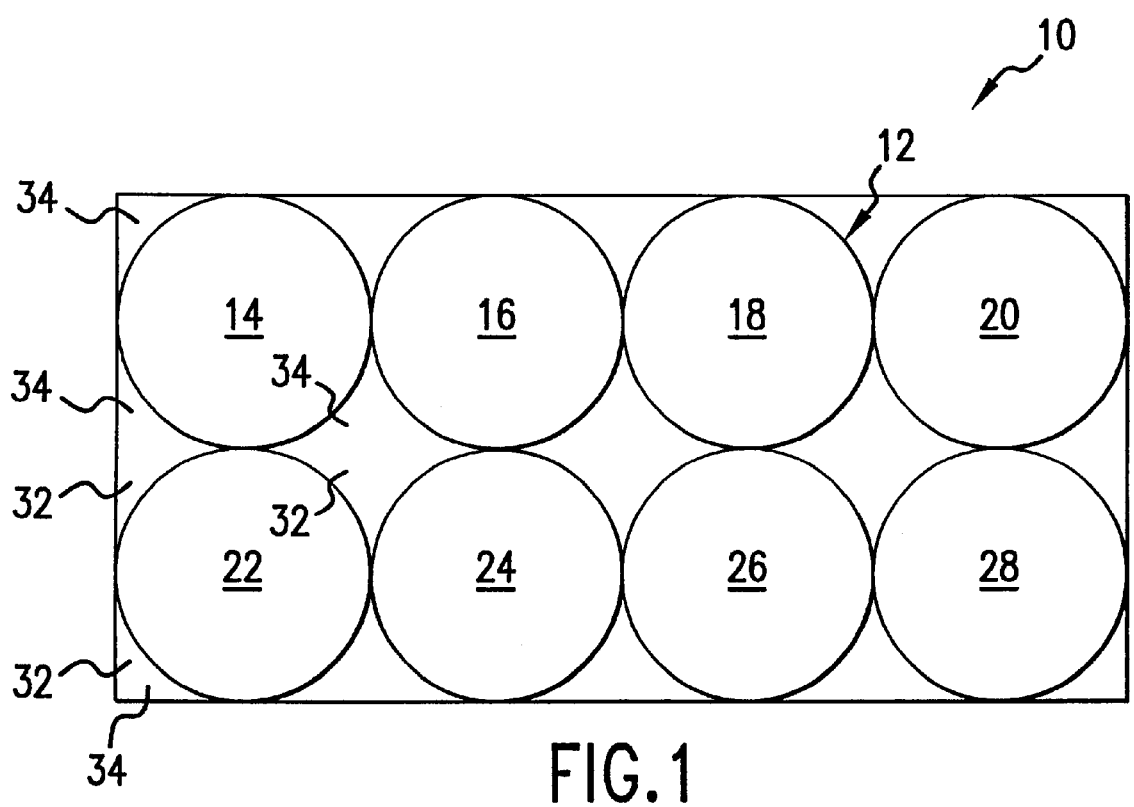
FIG. 1 is a top view schematic of a battery module incorporating a thermal management system in accordance with one embodiment of the invention.

The present invention may be embodied in a variety of different structures. As representative, FIG. 1 illustrates the present invention as embodied in a battery module, generally designated by the reference numeral 10. The battery module 10 includes a cell package 12 composed of eight (8) cell elements 14, 16, 18, 20, 22, 24, 26 and 28 such as known in the art.

Figure 2:
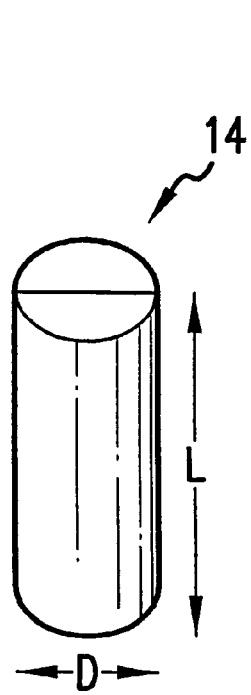
FIG. 2 is a perspective schematic of a cell element used in the battery module shown in FIG. 1.

FIG. 2 illustrates the cell element 14 in isolation and in greater detail. As shown, the cell element 14 has a generally cylindrical shape composed of a length L and a width D. While such shaped cell elements are common and well known, the broader practice of the invention is not necessarily so limited as cell elements having other desired shapes or sizes can, if desired, be used alone or in combination.

Figure 3:
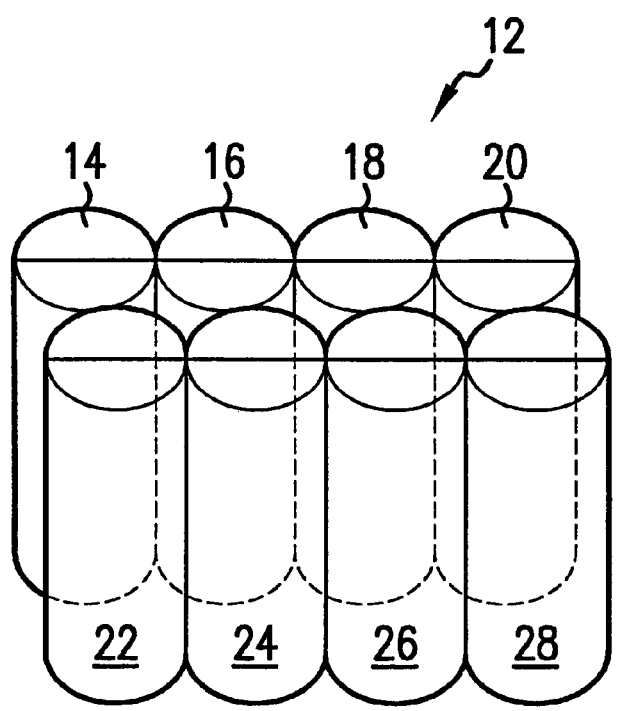
FIG. 3 is a perspective schematic of the cell elements used in the battery module shown in FIG. 1.

FIG. 3 illustrates the cell package 12 in isolation and in greater detail.

Returning to FIG. 1, the battery module 10 forms or includes void spaces, generally designated by the reference numeral 32, between the various adjacent cell elements 14, 16, 18, 20, 22, 24, 26 and 28 of the cell package 12.

In accordance with a preferred practice of the invention, such battery module voids are filled or otherwise appropriately contain a suitable phase change material (PCM), generally designated by the reference numeral 34 and such as described in greater detail below, such as to facilitate desired thermal management within such a power supply system. In particular, in the illustrated embodiment, the phase change material 34 surrounds each of the cell elements 14, 16, 18, 20, 22, 24, 26 and 28, and is in general thermal contact therewith.

In accordance with one preferred embodiment of the invention, the so included or incorporated phase change material 34 can desirably serve or act as a heat sink to absorb excess heat generated within the module 10 such as during the relatively highly exothermic process of battery discharge or charge. In particular, the heat generated from the cells 14, 16, 18, 20, 22, 24, 26 and 28 during discharge can be stored, at least temporarily in the phase change material 34 as latent heat.

Thus, the phase change material 34 permits the storage of such heat for later or subsequent use or utilization. For example, the heat stored or otherwise contained within such phase change material can later be appropriately released or, as commonly referred to, "rejected" for appropriate use in or in conjunction with the battery module 10. In particular, such stored heat can be appropriately rejected to the cell module during relaxation and keep the cells at an elevated temperature above the surrounding temperature for an extended period of time. For example, such heat can be later rejected such as when the battery temperature drops such as during battery charge or under cold weather conditions.

Various phase change materials, such as known in the art, can suitably be used in the practice. For example, suitable phase change materials for use in Li-ion battery applications desirably will have a melting point in the range of between about 30° C. and 60° C., a high latent heat per unit mass ratio, and a narrow melting temperature range. Further, phase change materials for use in the practice of the invention will also desirably be thermally cyclable, non-hazardous, non-contaminant, non-reactive or otherwise inert with respect to other battery components, nontoxic, cheap and of relatively light weight or density. Thus, suitable such phase change materials may generally include paraffin waxes such as are relatively inexpensive, not easily or prone to decomposition and which generally have a relatively low melting temperature within the recommended range of operation for Li-ion cells.

Alternatively, those skilled in the art and guided by the teachings herein provided will appreciate that chlorobenzene and bromobenzene crystallize with very similar structure and have a low and narrow temperature range of crystallization. Thus, mixtures of chlorobenzene and bromobenzene may be suitable for particular applications such as involving precise temperature control between about 30° C. to about 45° C., for example.

Other possible or suitable phase change materials for such applications may include stearic acid which has a melting point of about 70° C., and various commercially available esters of stearic acid with methyl, propyl and butyl alcohols, having melting points in the range of about 17° C. to about 34° C. Another candidate phase change material for use in the practice of the invention is polyethylene glycol (PEG). Potential or possible problems or concerns with thermal degradation by or of PEG may, however, prevent, limit or otherwise restrict such use or application. In view of the above, it is to be understood that the broader practice of the invention is not necessarily limited or restricted to the use of or the practice in conjunction with specific or particular phase change materials.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Figure 4:
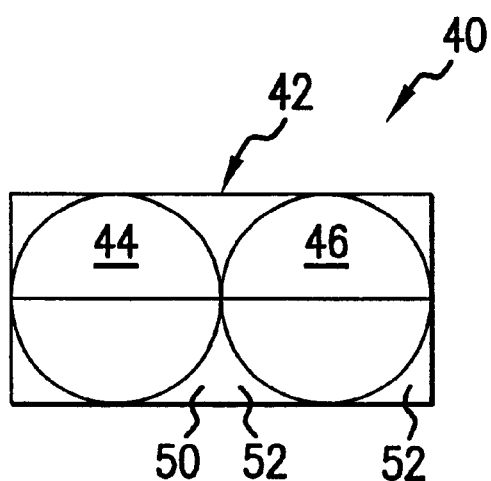
FIG. 4 is a top view schematic of a corner of the simulated battery module showing two cells out of eight total cells in the module.

For purposes of these simulation examples, a rechargeable battery module composed of eight (8) scaled-up prototype cells connected in series and similar in arrangement to the battery module 10 shown in FIG. 1 is assumed. This simulated battery module, generally designated by the reference numeral 40 and, specifically a corner 42 thereof which contains two cells (individually designated by the reference numeral 44 and 46, respectively) out of eight total cells is shown in FIG. 4. As will be appreciated, the corner pair of cells 44 and 46 generally correspond to any of the corner pairs of cells, e.g., 14 and 16; 18 and 20; 22 and 24; and 26 and 28, shown in FIGS. 1 and 3.

It is further assumed that the scaled-up prototype cells of which the simulated battery module 40 is composed have the same chemistry as a known cell for which thermophysical properties and heat generation rates per unit volume have previously been measured and can be used as inputs.

The voids 50 between the module cells 44 and 46 are, in accordance with the invention, assumed to be filled with a phase change material 52 such as to overcome anticipated overheating problems. For purposes of these simulation examples, a paraffin wax phase change material having the physical properties identified in TABLE 1 below is assumed.

TABLE 1

Physical Properties of the Paraffin Wax Used in the Simulation

| Property | Value |
| --- | --- |
| Density of melted wax | 822 kg · m$^{-3}$ |
| Density of the solid wax | 910 kg · m$^{-3}$ |
| Melting Temperature | 56° C. |
| $C_p$ (melted wax) | 1770 J · kg$^{-1}$ · K$^{-1}$ |
| $C_p$ (solid wax) | 1770 J · kg$^{-1}$ · K$^{-1}$ |
| k (melt wax) | 0.21 W · m$^{-1}$ · K$^{-1}$ |
| k (solid wax) | 0.29 W · m$^{-1}$ · K$^{-1}$ |
| Latent heat of fusion | 195 kJ · kg$^{-1}$ |

A commercial two-dimensional finite element (FE) software program called PDEase2D™ by Macsyma Inc. was used to simulate the thermal behavior of the battery pack.

RESULTS AND DISCUSSION

FIGS. 5–8 are graphical representations of the temperature profile across the corner 42 of the battery module 40, shown in FIG. 4, during discharge at selected discharge rates (C/1, C/2, C/3 and C/6, respectively, and each under a heat transfer coefficient, h=6.4 W·m$^{-2}$·K$^{-1}$, which generally corresponds to the natural cooling rate, that is without active cooling) and at various selected Depths of Discharge (DOD). Results for the other three corner cell pairs are assumed to be the same because of module symmetry.

Figure 5:
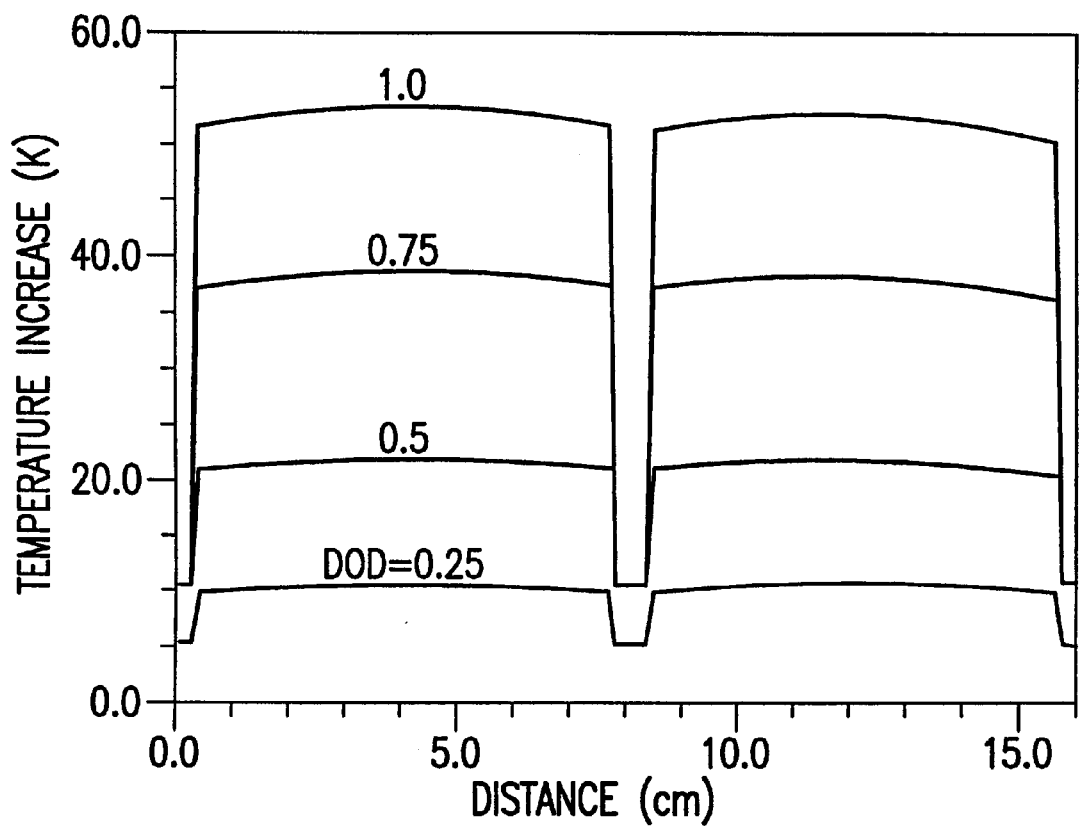
FIGS. 5–8 are graphical representations of the temperature profile across the corner of the battery module, shown in FIG. 4, during discharge at selected discharge rates and at various selected Depths of Discharge (DOD).

As shown in FIG. 5, the temperature rise at the center of both of the cells 44 and 46, at the end of discharge, is 53 K, while a temperature rise of only 11 K is realized for the PCM material. The temperature difference between the surface and the center of each of the cells is less than 2 K, at all DOD. The lower temperature rise in the phase change material is attributable to the latent heat of phase change which the phase change material undergoes. That is, most of the heat rejected by the module cells during discharge is stored as latent heat in the associated phase change material by changing the phase of this material, or a portion thereof, from solid to liquid. This stored heat can subsequently be released after the end of discharge such as during the time the cell is left to relax.

Figure 6:
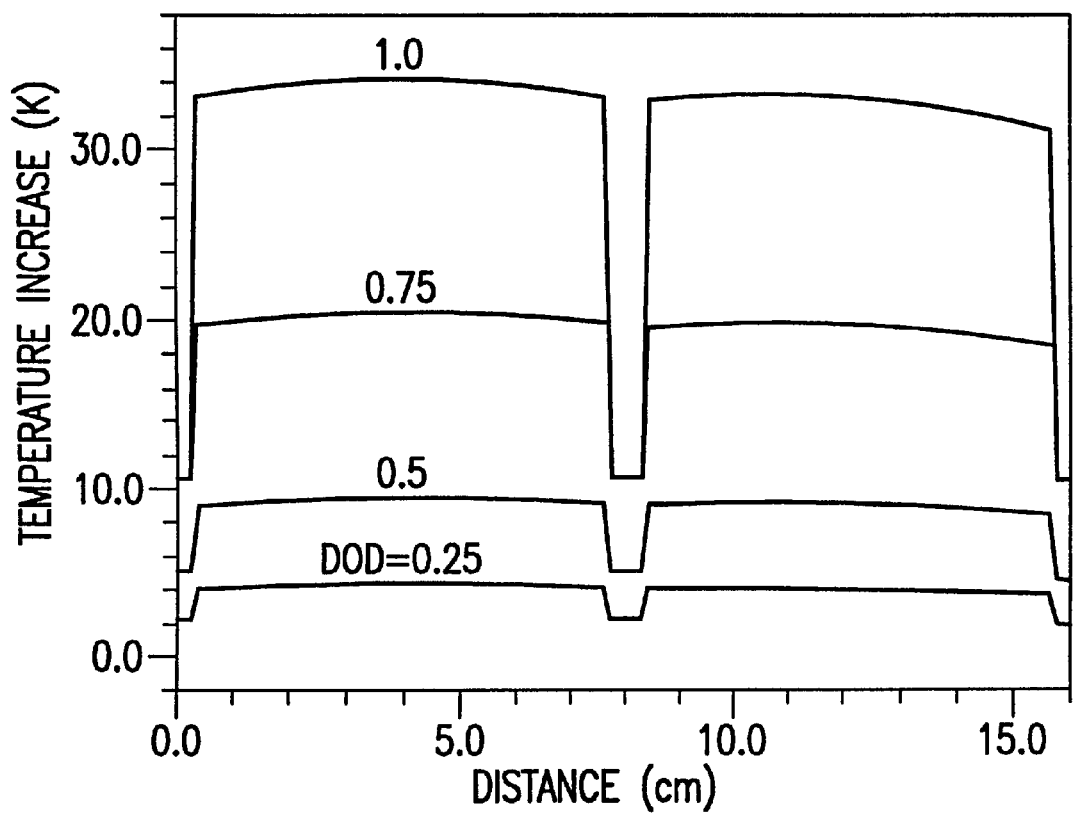
Figure 7:
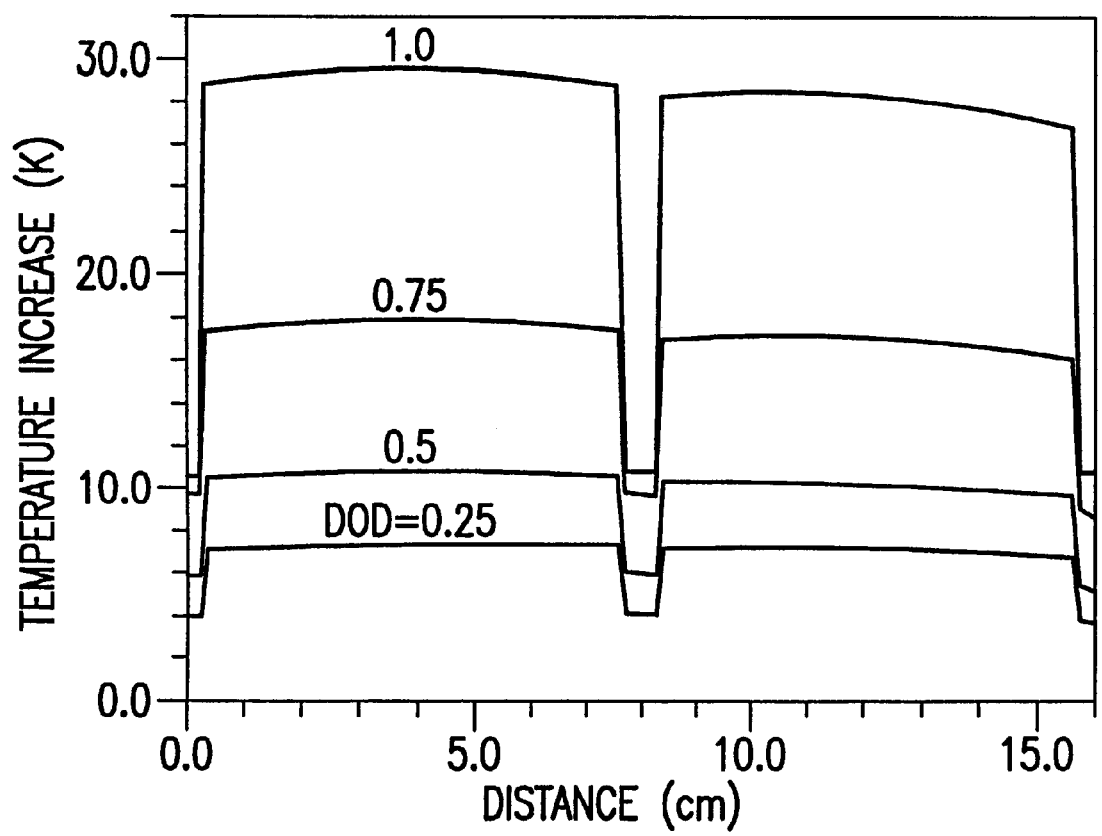
Figure 8:
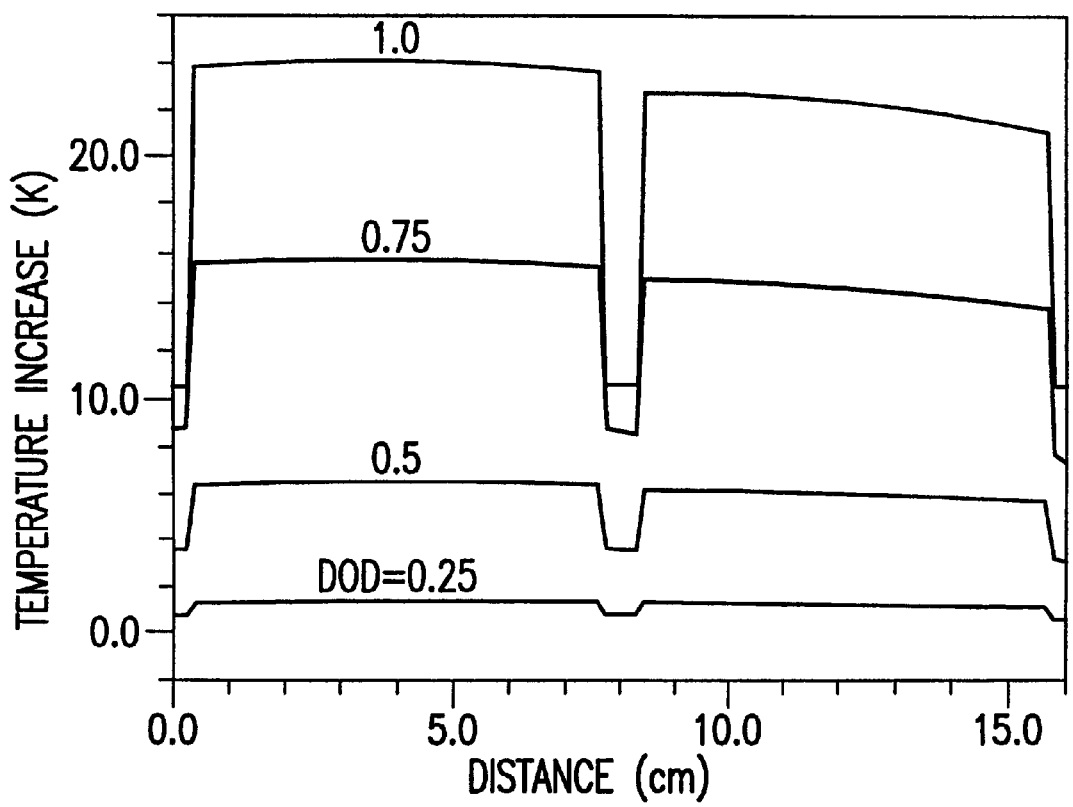

Similar results are found for the other discharge rates, as shown in FIGS. 6–8. The temperature rise at the center of both of the cells 44 and 46, at the end of discharge for the slower C/2, C/3 and C/6 discharge rates, are 34 K, 29 K and 24 K, respectively. Thus, as those skilled in the art and guided by the teachings herein provided will appreciate, discharge at a faster or greater rate generally results in increased heat generation and can thus heighten or increase the need for effective thermal management such as realizable with the implementation of the invention.

Figure 9:
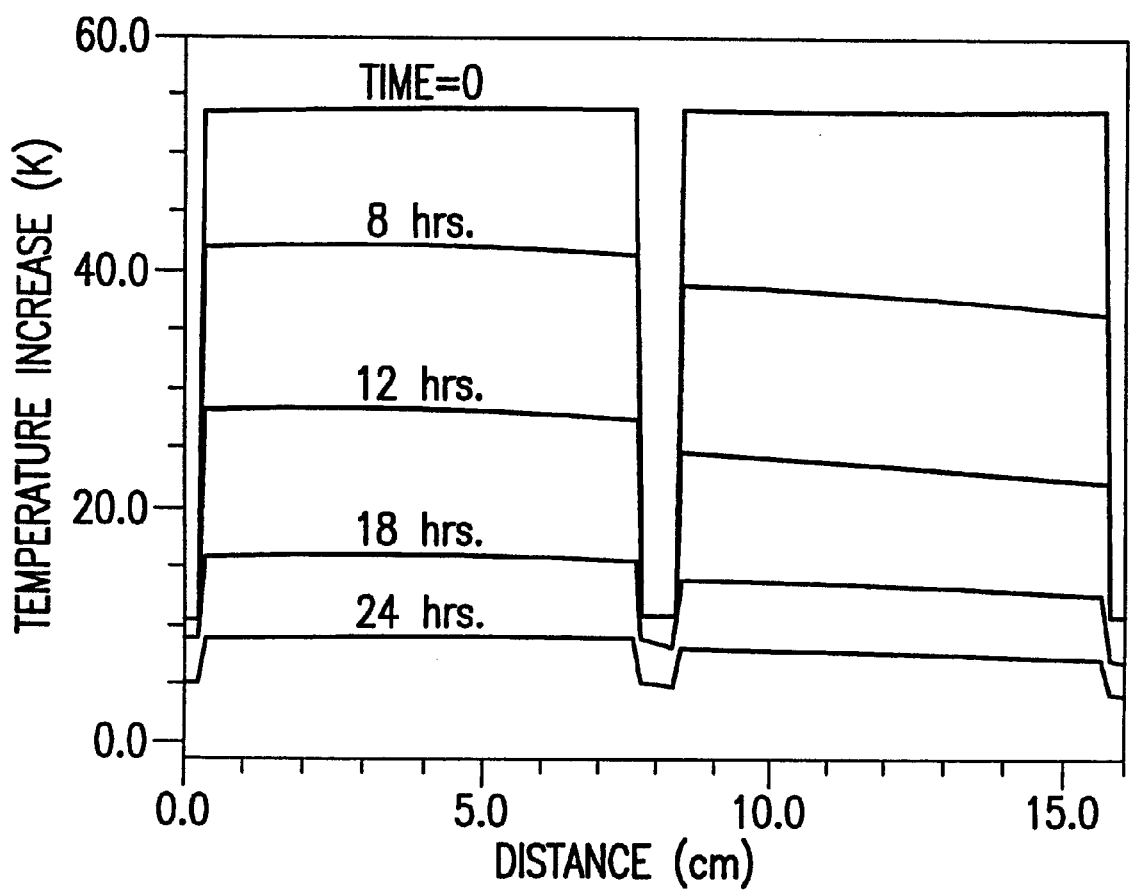
FIG. 9 is a graphical representation of the temperature profile across the corner of the battery module, shown in FIG. 4, at selected points in time during relaxation.

FIG. 9 is a graphical representation of the temperature profile across the corner 42 of the battery module 40, shown in FIG. 4, at selected points in time during relaxation. As shown, after 24 hours of relaxation, the temperature of each of the cells 44 and 46 was almost 10 K higher than the initial (surrounding) temperature. As will be appreciated, such performance can have significant design and use implications. For example, it has been shown that the utilized capacity of the Li-ion batteries is strongly dependent on temperature, especially at low operating temperatures. Thus, the utilized capacity of a corresponding battery can be significantly increased by elevating the cell temperature during operation. As another example, the performance of fuel batteries (fuel cell batteries) such as utilizing hydrogen or methanol fuel and operating with state-of-the-art solid polymer electrolyte has been shown to deteriorate severely beyond a certain maximum temperature. Therefore, rapid removal of heat developed during periods of high power output is necessary, which in a confined space can be achieved efficiently by a phase change material.

In view thereof and in accordance with one preferred embodiment of the invention, utilization of heat stored in an associated phase change material can enable the cells in the battery pack to stay at a higher temperature than the surrounding temperature during relaxation and hence increase the utilized capacity when the cell is then charged or discharged. Thus, the invention may have various significant practical applications such as with respect to batteries or cells used in an electric vehicle battery module when under cold conditions.

Another contemplated example of application of the invention is in conjunction with battery power supply systems (e.g., Li-ion battery or the like) such as used for or with space satellites. For example, as a satellite is orbiting the earth, such a satellite typically goes through a sudden temperature change when it moves from the light side to the dark side of the earth. Such a sudden drop in temperature can affect the performance of the battery. Through application and practice of the invention, heat stored in the battery pack, via a suitable phase change material, can be used to decrease the effect of such a sudden temperature change.

As will be appreciated, power supply systems and methods of operation such as described above are capable of application in various contexts. In view thereof, the broader practice of the invention is not necessarily limited to practice or use in conjunction with a specific or particular context. As currently contemplated, however, the invention may find particular applicability or suitability for use in or in conjunction with battery packs, such as include or incorporate a plurality of Li-ion cell or batteries, such as may find application or use to power electric vehicles (EV).

Thus, the invention provides a power supply system and method of operation which provides or results in improved thermal management. In particular, the invention provides a power supply system and method of operation which are either or both more effective and efficient than otherwise previously realizable. Further, the invention desirably provides a thermal management system such as can desirably better ensure one or more of the performance, safety or capacity of an associated power supply. At least partially as a result thereof, practice of the invention may more conveniently or effectively permit the use of larger-sized battery power supplies such as contemplated or envisioned for certain applications, such as to power electric vehicles, for example.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method of operating a power supply system, the method comprising:
   discharging at least one cell element of a battery module to produce a quantity of power and a quantity of heat,
   absorbing at least a portion of the quantity of heat in a phase change material in thermal contact with the discharging cell element,
   following discharge, releasing at least a portion of the absorbed quantity of heat from the phase change material to heat the at least one cell element, and
   discharging the at least one cell element at elevated temperature.

2. The method of claim 1 wherein the at least one cell element is one of a plurality of cell elements contained within the battery module in a preselected configuration.

3. The method of claim 2 wherein the at least one cell element is discharged in parallel with at least another of the plurality of cell elements.

4. The method of claim 2 wherein the at least one cell element is discharged in series with at least another of the plurality of cell elements.

5. The method of claim 1 wherein the subsequent releasing of at least a portion of the absorbed quantity of heat from the phase change material to heat the at least one cell element occurs during recharging or discharging of the at least one cell element.

6. The method of claim 1 wherein at least a portion of the quantity of power is supplied to power an electric vehicle.

7. The method of claim 1 wherein at least a portion of the quantity of power is supplied to power a personal electric device.

8. The method of claim 1 wherein the at least one cell element comprises a Li cell.

9. The method of claim 1 wherein the at least one cell element comprises a fuel cell battery.

10. The method of claim 9 wherein the fuel cell battery utilizes hydrogen fuel.

11. The method of claim 9 wherein the fuel cell battery utilizes methanol fuel.

* * * * *